UNITED STATES PATENT OFFICE.

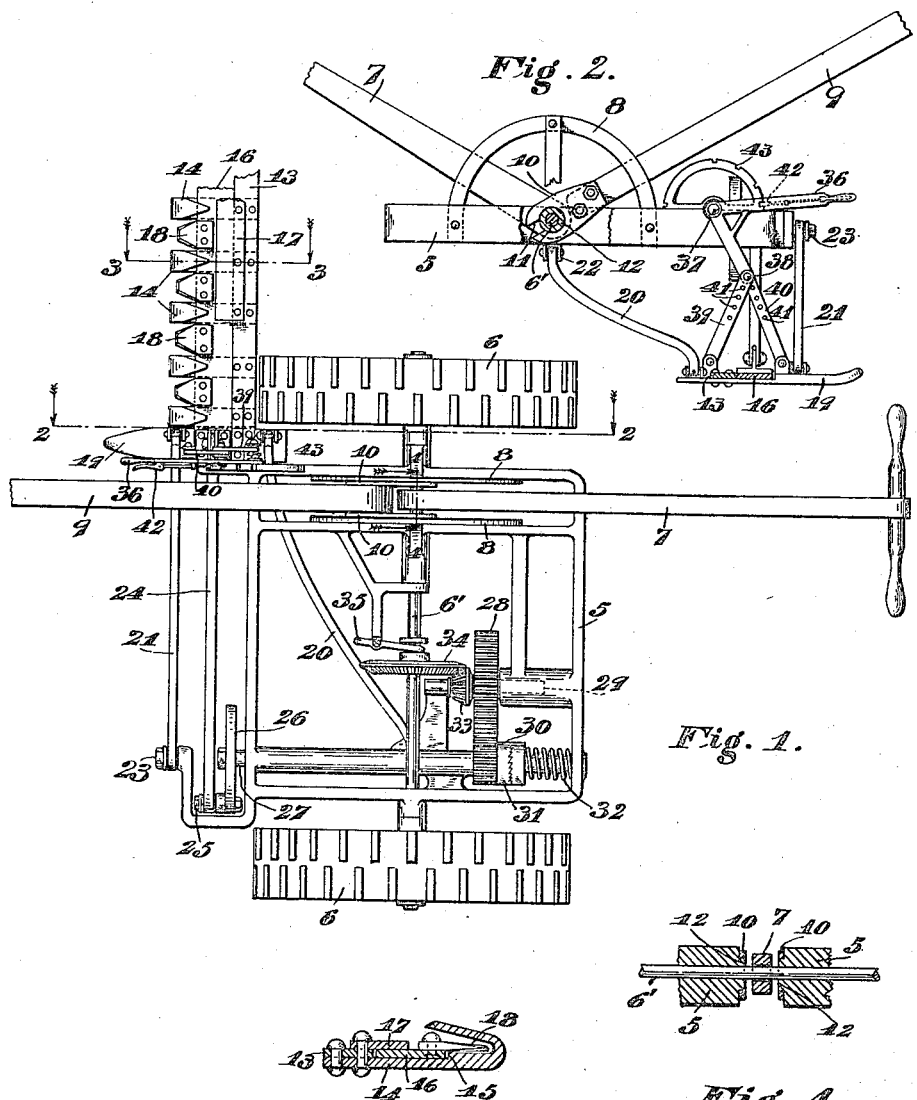

JOHN P. FORST, OF CHICAGO, ILLINOIS.

MOWER.

1,262,658.  Specification of Letters Patent.  Patented Apr. 16, 1918.

Application filed October 7, 1916. Serial No. 124,393.

*To all whom it may concern:*

Be it known that I, JOHN P. FORST, a citizen of the United States, and a resident of the city of Chicago, county of Cook, and State of Illinois, have invented certain new and useful Improvements in Mowers, of which the following is a specification.

My invention relates to improvements in mowers of the hand operated type and has for its object the production of a device of this character in which will be provided improved means for adjusting the cutter arm and also in which will be provided improved means for effecting manual propulsion of the machine. A further object is the production of a machine as mentioned which will be of durable and economical construction and efficient in use. Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of a mower, embodying the invention, and Figs. 2, 3 and 4 are detail sections taken on lines 2—2, 3—3 and 4—4 respectively of Fig. 1.

The preferred form of construction as illustrated in the drawings comprises a metallic frame 5 of skeleton form and substantially rectangular in outline. The frame 5 is mounted upon wheels 6 which are secured to the ends of a shaft 6' rotatably mounted in said frame. Permanently connected with the shaft 6' is a pivotally adjustable handle 7 through the medium of which the machine may be propelled manually over the ground. Secured to the frame 5 and arising therefrom at either side of handle 7, adjacent the pivoted end thereof, are curved guide plates 8. Also provided for effecting propulsion of the machine is a second or auxiliary handle 9 which is detachably connected with the machine. Said detachable connection comprises two plates 10 which are detachably bolted to the rearward end of said handle 9, said plates 10 having slots 11 which are of a width at their outer ends to permit of the same being slid over the shaft 6'. The rearward or inner ends of slots 11 are enlarged so that, when said slots are in engagement with the shaft 6', said enlarged portions of said slots may be engaged with circular lugs or bosses 12 formed on adjacent portions of the frame 5, as clearly shown in Fig. 4, by simply moving said plates 10 laterally into engagement with said lugs. Sufficient space is provided between the handle 7 and the inner sides of lugs or bosses 12 to permit of the insertion of plates 10 into engagement with the shaft. After the plates 10 have been moved laterally into engagement with said lugs or bosses, the end of handle 9 is inserted between the outer ends of said plates and bolted therethrough The width of said handle is such that, when the same is attached to said plates, as mentioned, it will prevent said plates from becoming disengaged from the lugs or bosses 12.

Projecting laterally from one side of the frame 5 is a cutting arm consisting of a rigid bar 13 to which are secured forwardly projecting spaced stationary cutters 14. Slidably mounted upon the upper sides of member 14, the same being interposed between the bar 13 and shoulders 15 formed in said members 14, as clearly shown in Fig. 3, is a bar 16 held in place by an elongated plate 17 which is secured to the bar 13. Carried upon the bar 16 are spaced forwardly projecting cutters 18 adapted, upon reciprocation of the member 16, to coöperate with the stationary cutters 14, in the cutting operation.

The bar 13 is rigidly connected at its inner end to a shoe 19 which in turn is pivotally connected with the outer ends of arms 20 and 21 which are pivotally connected at their inner ends with the frame 5 as at 22 and 23 respectively.

Reciprocation of the cutter bar 16 is effected by means of a rod 24 pivotally connected at one end with said cutter bar, the opposite end of said rod engaging with a crank pin 25 provided upon a crank disk 26 fixed to a shaft 27 which is rotatably mounted in frame 5. Driving of the shaft 27 is effected by means of a large gear 28 mounted upon a jack-shaft 29, said gear 28 meshing with a smaller gear 30 which is loosely mounted upon the shaft 27. A clutch mechanism 31 normally held in operative condition by means of a helical compression spring 32 coöperates with the gear 30 for operatively connecting the same with shaft 27. Also mounted upon the jack-shaft 29 is a bevel gear 33 with which is adapted to mesh a larger bevel gear 34 which is splined to shaft 6'. A conventional gear shifting mechanism 35 coöperates with the gear 34, whereby the same may be manually moved into and out of mesh with the gear 33 in order to operatively connect the cutting mechanism with the wheels 6 of the mower.

Vertical adjustment of the inner end of the cutter arm is effected by means of a bell crank lever 36 which is fulcrumed at 37 to the frame 5. The lower end of the lever 36 is pivotally connected at 38 with the upper ends of two links 39 and 40 which are pivotally connected at their lower ends with the shoe 19. Each link 39 and 40 is formed with a plurality of spaced openings 41 whereby the same may be shortened, that is the point of pivotal connection of same with the lever 36 altered in order to effect vertical adjustment of the inner end of the cutter arm. With the construction set forth it will of course be seen that vertical adjustment of the inner end of the cutter arm may be effected through manipulation of the lever 36, a conventional manually operable locking mechanism 42 adapted for coöperation with a notched segment 43 being provided for coöperation with said lever 36 in order to hold the same in positions of pivotal adjustment and hence the cutter arm in positions of vertical adjustment.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a mower, the combination of a frame; a shaft in said frame; a pair of handles connected with said frame for propelling the same, one of said handles being permanently connected with said frame and the other of said handles being detachably connected with said frame, the detachable connection of said last mentioned handle comprising a pair of spaced plates on said handle having slots adapted to receive said shaft, said slots having enlarged inner ends; and lugs on said frame for engagement by said enlarged ends of said slots, substantially as described.

2. In a mower, the combination of a frame; a shaft in said frame; a pair of handles connected with said frame for propelling the same, one of said handles being permanently connected with said frame and the other of said handles being detachably connected with said frame, the detachable connection of said last mentioned handle comprising a pair of spaced plates on said handle having slots adapted to receive said shaft, said slots having enlarged inner ends; and lugs on said frame for engagement by said enlarged ends of said slots, said lugs being spaced apart a distance substantially the same as the distance between said plates when mounted on said handle, substantially as described.

In testimony whereof I have signed my name to this specification in the presence of two subscribing witnesses.

JOHN P. FORST.

Witnesses:
JOSHUA R. H. POTTS,
B. G. RICHARDS.

Copies of this patent may be obtained for five cents each, by addressing the "Commissioner of Patents, Washington, D. C."